United States Patent
Chung et al.

(10) Patent No.: US 12,487,932 B2
(45) Date of Patent: Dec. 2, 2025

(54) CONTROLLER OF STORAGE DEVICE

(71) Applicant: SK hynix Inc., Gyeonggi-do (KR)

(72) Inventors: Hyun Jin Chung, Gyeonggi-do (KR); Hee Cheol Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 82 days.

(21) Appl. No.: 18/486,165

(22) Filed: Oct. 13, 2023

(65) Prior Publication Data

US 2024/0362164 A1   Oct. 31, 2024

(30) Foreign Application Priority Data

Apr. 26, 2023   (KR) .................. 10-2023-0054851

(51) Int. Cl.
G06F 12/08       (2016.01)
G06F 12/02       (2006.01)
G06F 12/0815     (2016.01)

(52) U.S. Cl.
CPC ...... *G06F 12/0815* (2013.01); *G06F 12/0215* (2013.01)

(58) Field of Classification Search
CPC ............ G06F 12/0815; G06F 12/0888; G06F 12/0862; G06F 12/0868; G06F 2212/312; G06F 2212/1024; G06F 2212/502; G06F 12/02; G06F 12/08; G06F 12/0215; G06F 12/0223; G06F 12/0253; G06F 12/0615
See application file for complete search history.

(56) References Cited

U.S. PATENT DOCUMENTS

| | | | |
|---|---|---|---|
| 7,051,221 B2 | 5/2006 | Clabes et al. | |
| 11,061,828 B1* | 7/2021 | Peterson | G06F 12/0875 |
| 2012/0110270 A1* | 5/2012 | Moyer | G06F 12/0831 |
| | | | 711/146 |
| 2015/0193236 A1* | 7/2015 | Lin | G06F 9/3806 |
| | | | 712/207 |
| 2018/0165204 A1* | 6/2018 | Venkatesh | G06F 12/084 |
| 2018/0336136 A1* | 11/2018 | Hijaz | G06F 12/0215 |
| 2023/0205699 A1* | 6/2023 | Sha | G06F 9/3816 |
| | | | 711/137 |

FOREIGN PATENT DOCUMENTS

GB          2572954 A  * 10/2019 ......... G06F 12/0862
KR   10-2021-0038313 A      4/2021

OTHER PUBLICATIONS

Chang, J.-C. Luo and D.-W. Chang, "A Load-Balancing Data Caching Scheme in Multi-tiered Storage Systems," 2016 IEEE 18th International Conference on High Performance Computing and Communications, 2016, pp. 124-127.*

(Continued)

*Primary Examiner* — Pierre Michel Bataille
(74) *Attorney, Agent, or Firm* — IP & T GROUP LLP

(57) ABSTRACT

A controller of a storage device includes a memory configured to serve as a lookahead cache; a read request storage configured to store therein read requests; and a cache manager configured to perform a bottleneck check operation when a process for a cache hit read request stored in the read request storage is completed, and selectively deactivate the lookahead cache based on a check result in bottleneck check operations.

18 Claims, 5 Drawing Sheets

(56) References Cited

OTHER PUBLICATIONS

X. Ruan, X. Jiang and H. Chen, "Cached Mapping Table Prefetching for Random Reads in Solid-State Drives," 2021 IEEE International Conference on Networking, Architecture and Storage (NAS), Riverside, CA, USA, 2021, pp. 1-6.*

Jahangir Hasan, Satish Chandra and T. N. Vijaykumar, "Efficient use of memory bandwidth to improve network processor throughput," 30th Annual International Symposium on Computer Architecture, San Diego, CA, USA, 2003, pp. 300-311.*

* cited by examiner

CONTROLLER OF STORAGE DEVICE

CROSS-REFERENCES TO RELATED APPLICATION

The present application claims priority under 35 U.S.C. § 119(a) to Korean application number 10-2023-0054851, filed on Apr. 26, 2023, which is incorporated herein by reference in its entirety as set forth in full.

BACKGROUND

1. Technical Field

Various embodiments of the present disclosure relate to a controller of a storage device.

2. Related Art

A storage device may store, in response to a write request from an external device, data provided from an external device. Additionally, the storage device may provide, in response to a read request from the external device, stored data to the external device. The external device may be an electronic device capable of processing data and may include computers, digital cameras, mobile phones and so forth. The storage device may be embedded within the external device to operate or may be designed in a detachable form to be connected to the external device to operate. The storage device may include a memory device for storing data.

In order to efficiently handle read requests from an external device, the storage device may activate cache functionality. However, depending on the workload of the external device, the cache functionality may act as a bottleneck of the storage device. Therefore, there is a need for approaches that promptly respond to various workloads of the external device to effectively utilize the cache.

SUMMARY

In an embodiment of the present disclosure, a controller of a storage device may include a memory configured to serve as a lookahead cache; a read request storage configured to store therein read requests; and a cache manager configured to perform a bottleneck check operation when a process for a cache hit read request stored in the read request storage is completed, and selectively deactivate the lookahead cache based on a check result in bottleneck check operations.

In an embodiment of the present disclosure, a controller of a storage device may include a memory configured to serve as a lookahead cache; a read request storage configured to store therein read requests; and a cache manager configured to selectively deactivate the lookahead cache based on the read requests stored in the read request storage and a bottleneck history.

In an embodiment of the present disclosure, a controller of a storage device may include a memory configured to serve as a lookahead cache; a read request storage configured to store therein read requests; and a cache manager configured to determine whether a bottleneck is caused by the lookahead cache based on the read requests stored in the read request storage, and selectively deactivate the lookahead cache based on a bottleneck history when determining that the bottleneck is caused by the lookahead cache.

DETAILED DESCRIPTION

Hereinafter, various embodiments of the present disclosure will be described below with reference to the accompanying drawings.

Figure 1:
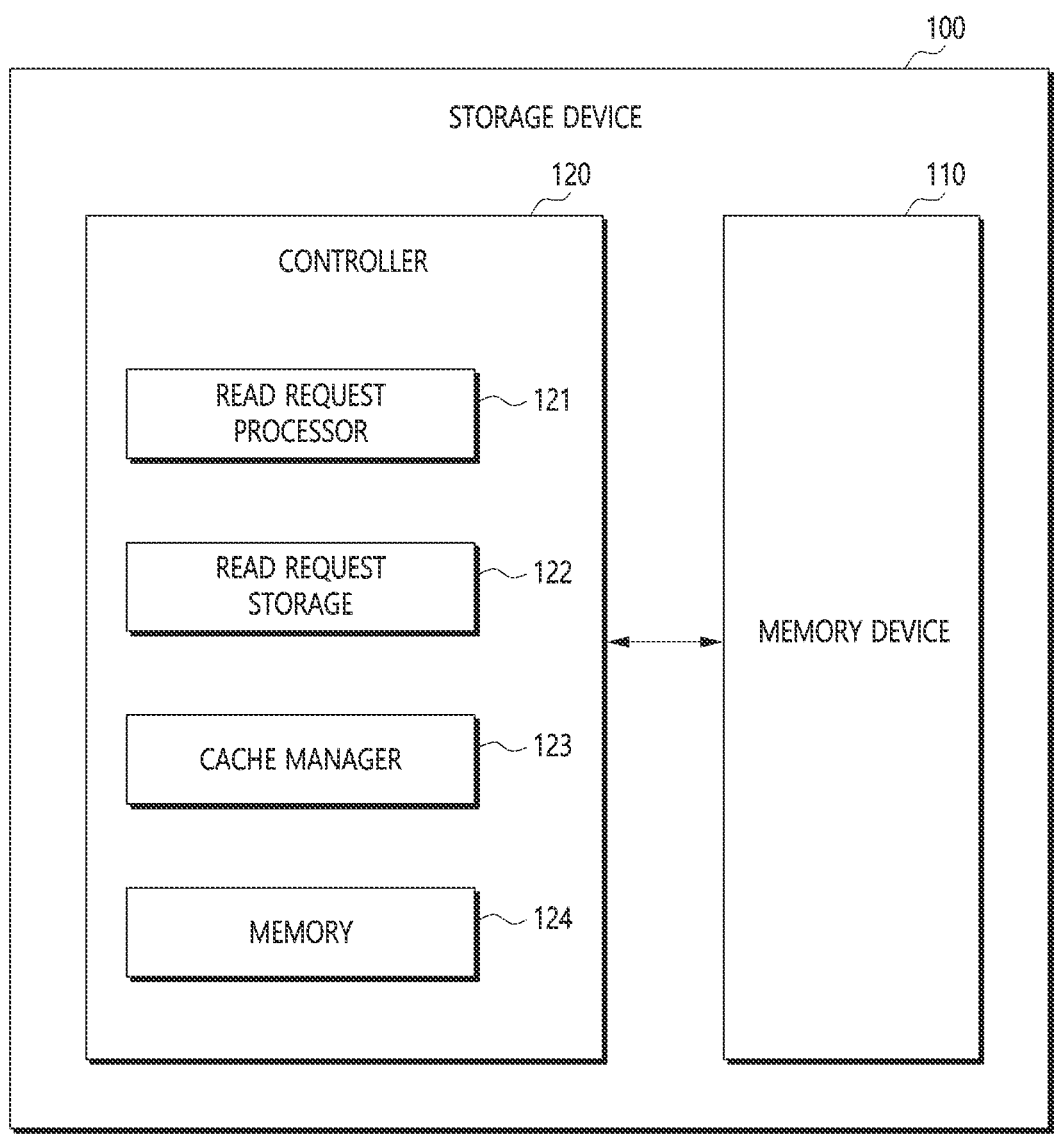
FIG. 1 is a block diagram illustrating a storage device including a controller according to an embodiment of the present invention.

FIG. 1 is a block diagram illustrating a storage device 100 including a controller 120 according to an embodiment of the present invention.

The storage device 100 may be configured to store, in response to a write request from an external device, i.e., a host device (not illustrated), data received from the host device. Additionally, the storage device 100 may be configured to provide, in response to a read request from the host device, stored data to the host device.

The storage device 100 may include a personal computer memory card international association (PCMCIA) card, a smart media card, a memory stick, various multimedia cards (e.g., MMC, eMMC, RS-MMC and MMC-micro), secure digital (SD) cards (e.g., SD, Mini-SD and Micro-SD), a universal flash storage (UFS) or a solid-state drive (SSD).

The storage device 100 may include a memory device 110 and the controller 120.

The memory device 110 may operate under the control of the controller 120. The memory device 110 may perform a read operation, a write operation, an erase operation and so forth.

The memory device 110 may be implemented by various types of memory devices such as a NAND flash memory, a 3-dimensional (3D) NAND flash memory, a NOR flash memory, a resistive random-access memory (RRAM), a phase change RAM (PRAM), a Magneto-resistive RAM (MRAM), a ferroelectric RAM (FRAM), a spin transfer torque RAM (STT-RAM) and so forth.

The controller 120 may control operations of the storage device 100. The controller 120 may control the memory device 110 in response to requests from the host device. For example, in response to a write request from the host device, the controller 120 may store the data from the host device into the memory device 110. Further, in response to a read request from the host device, the controller 120 may read data from the memory device 110 and transmit it to the host device.

Furthermore, the controller 120 may independently control the memory device 110. That is, the controller 120 may perform internally needed management operations even without receiving requests from the host device. For example, management operations may include a wear levelling operation, a garbage collection operation, a reclaim operation and other related operations. In some embodiments, these management operations may also be performed in response to requests from the host device.

The controller 120 may include a read request processor 121, a read request storage 122, a cache manager 123 and a memory 124. Each of the read request processor 121, the read request storage 122, the cache manager 123 and the memory 124 may be implemented by each or combination of hardware, software, firmware.

The read request processor 121 may process a read request from the host device. The read request processor 121 may determine whether the read request is a sequential read request. For example, when a size of data requested by the read request exceeds a predetermined threshold, the read request processor 121 may determine that the read request is a sequential read request. Further, when the logical addresses corresponding to the read request are consecutive, the read request processor 121 may determine that the read request is a sequential read request. Additionally, the read request processor 121 may determine whether a read request is a sequential read request based on various criteria or conditions.

The read request processor 121 may activate a lookahead cache when a read request received while a lookahead cache is deactivated is determined as a sequential read request. The read request processor 121 may activate the lookahead cache and utilize at least a portion of the memory 124 as the lookahead cache. The read request processor 121 may perform a prefetch operation using the activated lookahead cache. The prefetch operation may include an operation of reading in advance data, which is expected to be requested by a read request from the host device before actually receiving the read request, and an operation of storing the read data into the lookahead cache. For example, since sequential read requests are likely to be provided consecutively for consecutive logical addresses, the read request processor 121 may perform the prefetch operation on data indicated by a subsequent logical address to a logical address corresponding to a sequential read request. When the data corresponding to sequential read requests is prefetched or being prefetched in the lookahead cache (i.e., when a cache hit occurs), the read request processor 121 may provide the prefetched data to the host device. However, when the data corresponding to sequential read requests is not prefetched in the lookahead cache (i.e., when a cache miss occurs), the read request processor 121 may read the data from the memory device 110 and provide the read data to the host device. Hereinafter, a sequential read request that results in a cache hit may be referred to as 'a cache hit read request', while a sequential read request that results in a cache miss may be referred to as 'a cache miss read request'.

After the lookahead cache is activated, the read request processor 121 may deactivate the lookahead cache according to various deactivation conditions. For example, when a sequential read request is not provided from the host device for a predetermined period of time, the read request processor 121 may deactivate the lookahead cache. Additionally, when a threshold number of consecutive cache miss read requests occur, the read request processor 121 may deactivate the lookahead cache. Furthermore, as will be described later, the read request processor 121 may deactivate the lookahead cache based on a result of the bottleneck check operation performed by the cache manager 123.

According to an embodiment, the read request processor 121 may activate the lookahead cache not only according to sequential read requests but also according to various activation conditions. For example, the read request processor 121 may activate the lookahead cache when a new workload is detected while the lookahead cache is deactivated. For example, a new workload may be detected when a queue depth of the read request storage 122 changes, a size of transmission data changes or a new write/read request is provided after an idle period greater than a predetermined amount of time elapses.

The read request storage 122 may store therein the read requests from the host device. The read request processor 121 may sequentially process the read requests stored in the read request storage 122. Once one of the stored read requests has been processed by the read request processor 121, the processed read request may be removed from the read request storage 122. The read request storage 122 may include a queue (i.e., a command queue) configured to store therein the read requests in a sequential order.

When the rate of processing the read requests by the read request processor 121 is lower than the rate of receiving read requests from the host device, the read requests may accumulate in the read request storage 122. On the other hand, although the lookahead cache is designed to enhance the processing speed of sequential read requests, the lookahead cache may actually become a bottleneck for the controller 120 due to factors such as the overhead of prefetch operations and capacity limitations of memory 124, which may resultantly lead to a decrease in the overall performance of read request processing.

The cache manager 123 may perform a bottleneck check operation on the lookahead cache each time a cache hit read request is processed and completed while the lookahead cache is activated. The cache manager 123 may skip the bottleneck check operation when a cache miss read request is processed and completed. Based on results of the bottleneck check operations, i.e., based on the check result of a current bottleneck check operation and the check results of a reference number of consecutive previous bottleneck check operations, the cache manager 123 may decide whether to deactivate or keep the lookahead cache activated.

In the bottleneck check operation, the cache manager 123 may determine that there is a bottleneck caused by the lookahead cache when pending read requests are in the read request storage 122 at the time of performing the bottleneck check operation. In the bottleneck check operation, the cache manager 123 may determine that there is no bottleneck caused by the lookahead cache when no pending read request is in the read request storage 122 at the time of performing the bottleneck check operation. A pending read request in the read request storage 122 may be a subsequent read request following process-completed cache hit read requests. A pending read request is not limited to a sequential read request.

In the current bottleneck check operation, the cache manager 123 may decide to deactivate the lookahead cache when the cache manager 123 determines that a bottleneck is caused by the lookahead cache as a result of the current bottleneck check operation and determines that the bottleneck is caused by the lookahead cache as each result of the reference number of consecutive previous bottleneck check operations. On the other hand, the cache manager 123 may decide to keep the lookahead cache activated when the cache manager 123 determines that no bottleneck is caused by the lookahead cache as a result of the current bottleneck check operation. Additionally, the cache manager 123 may decide to keep the lookahead cache activated when the cache manager 123 in the current bottleneck check operation determines that no bottleneck is caused by the lookahead cache as a result of at least one of the reference number of consecutive previous bottleneck check operations. Furthermore, the cache manager 123 may decide to keep the lookahead cache activated when the cache manager 123 determines in the current bottleneck check operation that the reference number of previous bottleneck check operations have not been performed since the activation of the lookahead cache.

In accordance with an embodiment, the cache manager 123 may add, to a bottleneck history, a result of determining a bottleneck or no bottleneck caused by the lookahead cache during each bottleneck check operation. Therefore, the bottleneck history may include information on whether a bottleneck caused by the lookahead cache is indicated by each bottleneck check operation. The cache manager 123 may store the bottleneck history in a memory within the cache manager 123, or in the memory 124. The cache manager 123 may refer to the bottleneck history to check whether a bottleneck caused by the lookahead cache is indicated by each of the reference number of consecutive previous bottleneck check operations. The bottleneck caused by the lookahead cache and determined as results of the reference number of consecutive previous bottleneck check operations may indicate that the continuing bottleneck is caused by the lookahead cache for a predetermined section. Conversely, no bottleneck caused by the lookahead cache as a result of at least one of the reference number of consecutive previous bottleneck check operations may indicate that no bottleneck is caused by the lookahead cache in at least a partial section within the predetermined section.

The memory 124 may serve as a buffer to store therein data transferred between the host device and the memory device 110. When the lookahead cache is activated, the memory 124 may also be utilized as the lookahead cache.

Therefore, according to an embodiment, the cache manager 123 may promptly respond to various workloads of the host device and may effectively assess the performance of the lookahead cache. The cache manager 123 may determine whether there is a pending read request even though the cache hit read request has been processed quickly through the lookahead cache, thereby determining whether the lookahead cache is acting as a bottleneck. Additionally, when the lookahead cache is determined to have been consistently acting as a bottleneck for a certain amount of time, the cache manager 123 may deactivate the lookahead cache to improve the read performance of the controller 120.

Figure 2:
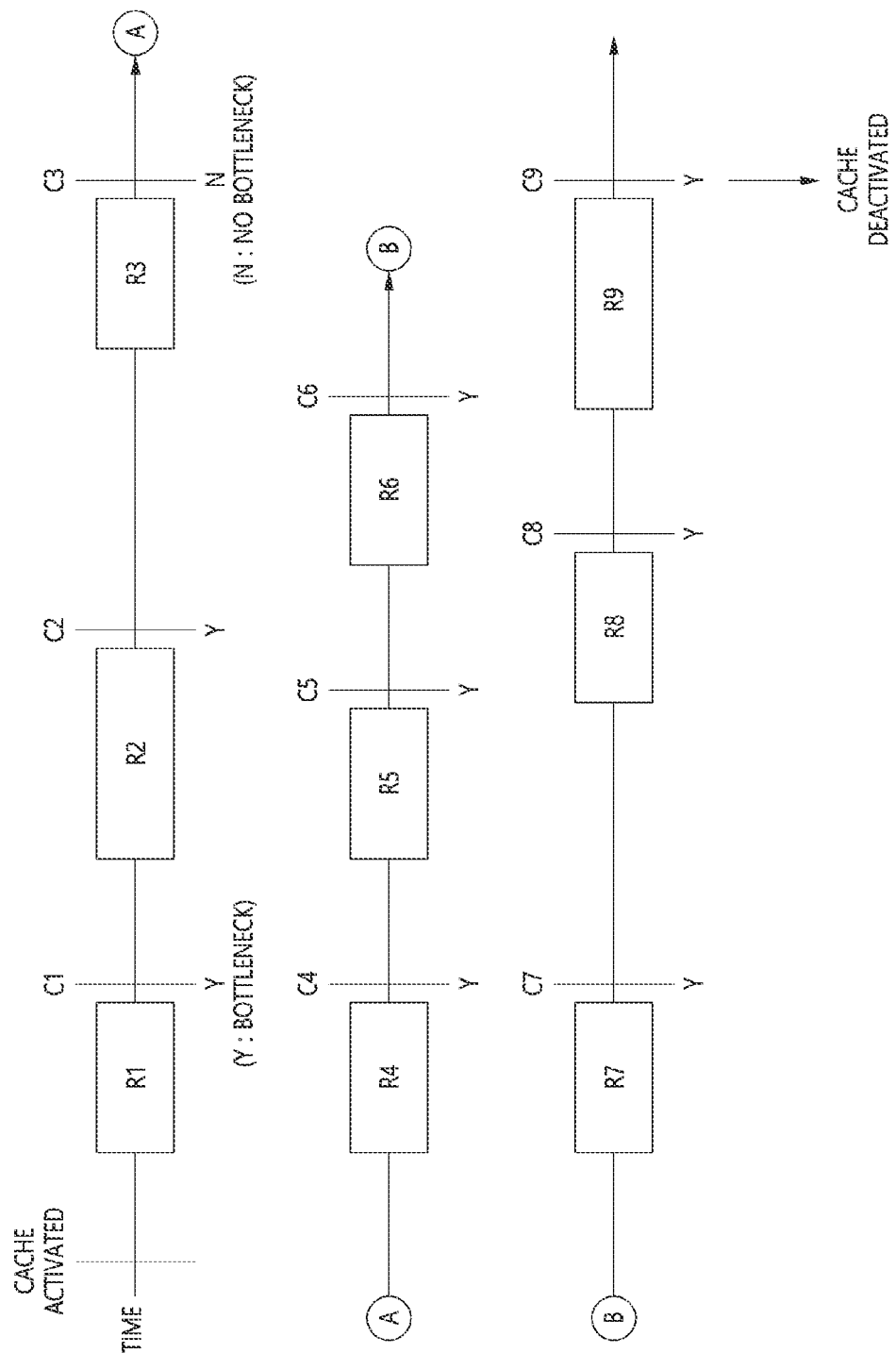
FIG. 2 is a diagram illustrating an operation of a cache manager in FIG. 1 according to an embodiment of the present invention.

FIG. 2 is a diagram illustrating an operation of the cache manager 123 in FIG. 1 according to an embodiment of the present invention.

According to FIG. 2, the cache manager 123 may operate when the lookahead cache is activated. When a process for a first cache hit read request R1 is completed, the cache manager 123 may perform a first bottleneck check operation C1. At this point, there may be a pending read request in the read request storage 122. Therefore, the cache manager 123 may determine that a bottleneck is caused by the lookahead cache in the first bottleneck check operation C1. Additionally, the cache manager 123 may determine that the reference number (e.g., 5) of consecutive previous bottleneck check operations has not yet been performed since the lookahead cache is activated. As a result, the cache manager 123 may decide to keep the lookahead cache activated.

Then, when a process for a second cache hit read request R2 is completed, the cache manager 123 may perform a second bottleneck check operation C2. At this time, there may be a pending read request in the read request storage 122. Therefore, the cache manager 123 may determine that a bottleneck is caused by the lookahead cache in the second bottleneck check operation C2. However, since the reference number (e.g., 5) of consecutive previous bottleneck check operations has not been performed yet after the activation of the lookahead cache, the cache manager 123 may decide to keep the lookahead cache activated.

Next, when a process for a third cache hit read request R3 is completed, the cache manager 123 may perform a third bottleneck check operation C3. At this point, there may not be any pending read requests in the read request storage 122. Therefore, the cache manager 123 may determine that no bottleneck is caused by the lookahead cache in the third bottleneck check operation C3. As a result, the cache manager 123 may decide to keep the lookahead cache activated.

Next, when a process for a fourth cache hit read request R4 is completed, the cache manager 123 may perform a fourth bottleneck check operation C4. At this point, there may be a pending read request in the read request storage 122. Therefore, the cache manager 123 may determine that a bottleneck is caused by the lookahead cache in the fourth bottleneck check operation C4. However, since the reference number (e.g., 5) of consecutive previous bottleneck check operations has not been performed yet after the activation of the lookahead cache, the cache manager 123 may decide to keep the lookahead cache activated.

Then, when a process for a fifth cache hit read request R5 is completed, the cache manager 123 may perform a fifth bottleneck check operation C5. At this time, there may be a pending read request in the read request storage 122. Therefore, the cache manager 123 may determine that a bottleneck is caused by the lookahead cache in the fifth bottleneck check operation C5. However, since the reference number (e.g., 5) of consecutive previous bottleneck check operations has not been performed yet after the activation of the lookahead cache, the cache manager 123 may decide to keep the lookahead cache activated.

Then, when a process for a sixth cache hit read request R6 is completed, the cache manager 123 may perform a sixth bottleneck check operation C6. At this time, there may be a pending read request in the read request storage 122. Therefore, the cache manager 123 may determine that a bottleneck is caused by the lookahead cache in the sixth bottleneck check operation C6. Additionally, the cache manager 123 may determine that at least one bottleneck check operation (e.g., the third bottleneck check operation C3) does not indicate the bottleneck caused by the lookahead cache among the reference number (e.g., 5) of consecutive previous first to fifth bottleneck check operations C1 to C5. As a result, the cache manager 123 may decide to keep the lookahead cache activated.

Then, when a process for a seventh cache hit read request R7 is completed, the cache manager 123 may perform a seventh bottleneck check operation C7. At this time, there may be a pending read request in the read request storage 122. Therefore, the cache manager 123 may determine that a bottleneck is caused by the lookahead cache in the seventh bottleneck check operation C7. Additionally, the cache manager 123 may determine that at least one bottleneck check operation (e.g., the third bottleneck check operation C3) does not indicate the bottleneck caused by the lookahead cache among the reference number (e.g., 5) of consecutive previous second to sixth bottleneck check operations C2 to C6. As a result, the cache manager 123 may decide to keep the lookahead cache activated.

Then, when a process for an eighth cache hit read request R8 is completed, the cache manager 123 may perform an eighth bottleneck check operation C8. At this time, there may be a pending read request in the read request storage 122. Therefore, the cache manager 123 may determine that a bottleneck is caused by the lookahead cache in the eighth bottleneck check operation C8. Additionally, the cache manager 123 may determine that at least one bottleneck check operation (e.g., the third bottleneck check operation C3) does not indicate the bottleneck caused by the lookahead cache among the reference number (e.g., 5) of consecutive previous third to seventh bottleneck check operations C3 to C7. As a result, the cache manager 123 may decide to keep the lookahead cache activated.

Then, when a process for a ninth cache hit read request R9 is completed, the cache manager 123 may perform a ninth bottleneck check operation C9. At this time, there may be a pending read request in the read request storage 122. Therefore, the cache manager 123 may determine that a bottleneck is caused by the lookahead cache in the ninth bottleneck check operation C9. Additionally, the cache manager 123 may determine that the bottleneck caused by the lookahead cache is indicated by each of the reference number (e.g., 5) of consecutive previous fourth to eighth bottleneck check operations C4 to C8. As a result, the cache manager 123 may decide to deactivate the lookahead cache.

Figure 3:
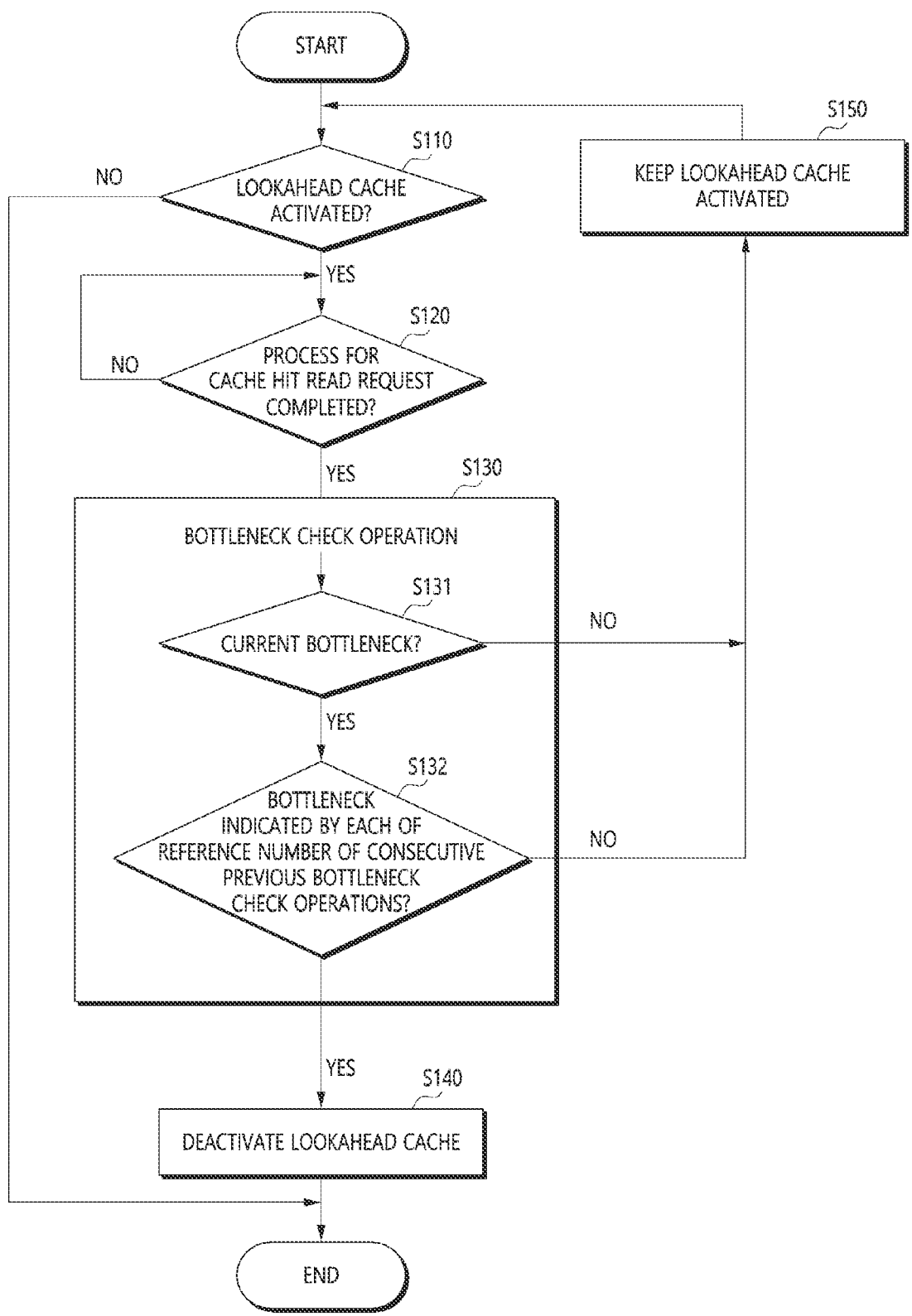
FIG. 3 is a flowchart illustrating the operation of the cache manager in FIG. 1 according to an embodiment of the present invention.

FIG. 3 is a flowchart illustrating the operation of the cache manager 123 in FIG. 1 according to an embodiment of the present invention.

Referring to FIG. 3, in operation S110, the cache manager 123 may determine whether the lookahead cache is activated. When the lookahead cache is determined as deactivated, for example, by the read request processor 121, the procedure may end. When the lookahead cache is determined as activated, the procedure may proceed to operation S120.

In the operation S120, the cache manager 123 may determine whether the process for the cache hit read request is completed. For example, the cache manager 123 may determine the process for the cache hit read request is completed when the read request processor 121 instructs a separate data processing unit (e.g., a direct memory access (DMA) module) (not illustrated) to provide the host device with data corresponding to the cache hit read request. For example, the cache manager 123 may determine the process for the cache hit read request is completed when providing the host device with data corresponding to the cache hit read request is completed.

Furthermore, for example, the cache manager 123 may communicate with the data processing unit and check whether the data processing unit receives an instruction for data transfer to determine whether the process for the cache hit read request is completed. For example, the cache manager 123 may determine whether the process for the cache hit read request is completed on a basis of a notification, which is provided from the read request processor 121 and indicates the completion of the process for the cache hit read request. For example, the cache manager 123 may check any pending read request remaining in the read request storage 122 to determine whether the process for the cache hit read request is completed. For example, the cache manager 123 may check the memory 124 to ascertain if prefetched data is provided to the host device to determine whether the process for the cache hit read request is completed.

When the process for the cache hit read request is determined not to be completed yet, the procedure may repeat the operation S120. When the process for the cache hit read request is determined to be completed, the procedure may proceed to operation S130.

In the operation S130, the cache manager 123 may perform the bottleneck check operation.

Specifically, in operation S131, the cache manager 123 may determine whether currently there is a bottleneck caused by the lookahead cache. Specifically, the cache manager 123 may determine the bottleneck when a pending read request is in the read request storage 122. The cache manager 123 may determine no bottleneck when no pending read request is in the read request storage 122. The result of determining whether currently there is a bottleneck caused by the lookahead cache may be added to the bottleneck history. When no bottleneck caused by the lookahead cache is determined, the procedure may proceed to operation S150. When a bottleneck caused by the lookahead cache is determined, the procedure may proceed to operation S132.

In the operation S132, the cache manager 123 may determine whether a bottleneck caused by the lookahead cache is indicated by each of the reference number of the consecutive previous bottleneck check operations. For the operation S132, the cache manager 123 may refer to the bottleneck history. When a bottleneck caused by the lookahead cache is indicated by each of the reference number of the consecutive previous bottleneck check operations, the procedure may proceed to operation S140. When no bottleneck caused by the lookahead cache is indicated by at least one of the reference number of the consecutive previous bottleneck check operations, the procedure may proceed to the operation S150. The procedure may also proceed to the operation S150 when it is determined that the reference number of the consecutive previous bottleneck check operations have not been performed yet after the activation of the lookahead cache.

In the operation S140, the cache manager 123 may decide to deactivate the lookahead cache.

In the operation S150, the cache manager 123 may decide to keep the lookahead cache activated. The procedure may then continue to the operation S110.

According to an embodiment, the order of performing the operations S131 and S132 may be changed. In this case, the cache manager 123 may decide to keep the lookahead cache activated regardless of determining a current bottleneck caused by the lookahead cache when it is determined that no bottleneck caused by the lookahead cache is indicated by at least one of the reference number of consecutive previous bottleneck check operations. Additionally, the cache manager 123 may decide to keep the lookahead cache activated regardless of determining a current bottleneck caused by the lookahead cache when it is determined that the reference number of consecutive previous bottleneck check operations have not been performed yet after the activation of the lookahead cache.

Figure 4A:
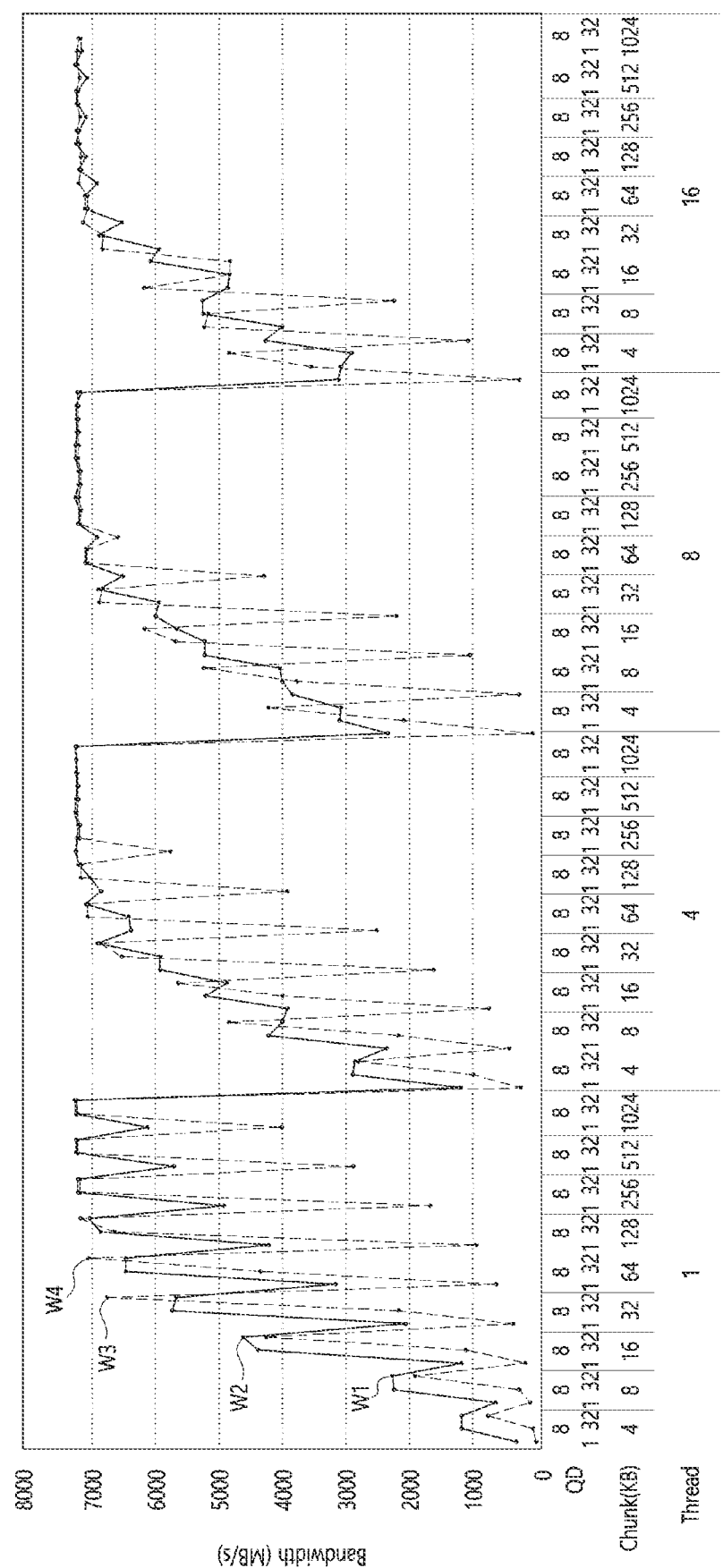
FIGS. 4A and 4B are diagrams illustrating results of performance tests conducted on the storage device according to an embodiment of the present invention.
Figure 4B:
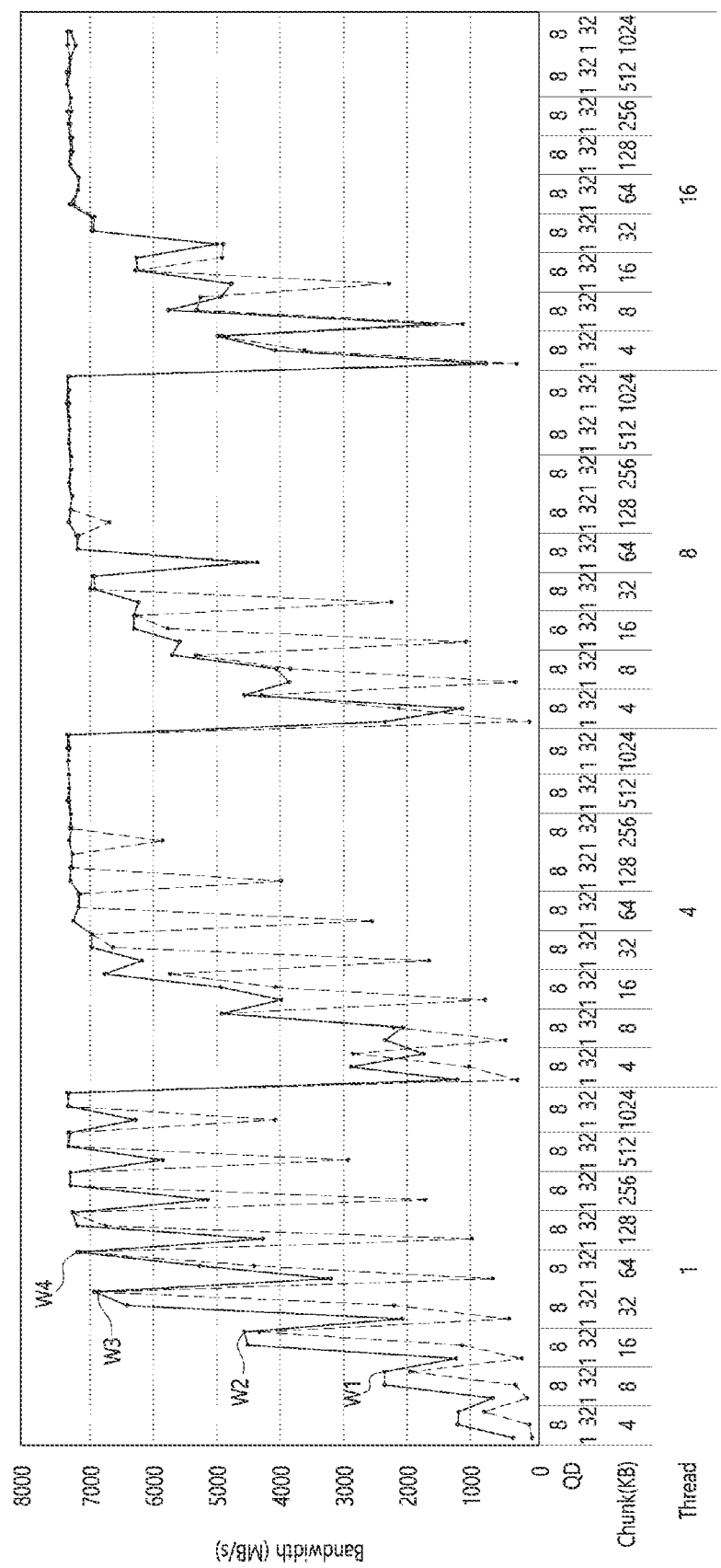

FIGS. 4A and 4B are diagrams illustrating results of performance tests conducted on the storage device 100 according to 2.5 an embodiment of the present invention. In FIGS. 4A and 4B, graphs represent the bandwidth on the vertical axis with respect to an example queue depth (QD), data size (Chunk), and thread number (Thread) on the horizontal axis. The queue depth (QD) may represent the maximum number of read requests that the read request storage 122 may store therein. The data size (Chunk) may represent the size of data requested by a single read request. The thread number (Thread) may represent the number of threads that transfer read requests from the host device. The bandwidth (Bandwidth) may represent the operational performance of the storage device 100.

The performance test on the storage device 100 may be conducted by measuring the bandwidth while varying the queue depth (QD), data size (Chunk) and thread number (Thread). The combinations of the queue depth (QD), the data size (Chunk) and the thread number (Thread) may represent various workloads. The product of the queue depth (QD), the data size (Chunk) and the thread number (Thread) (i.e., queue depth (QD)*data size (Chunk)*thread number (Thread)) may represent the total data size that the storage device 100 is processing at a given point in time.

The dashed line graph in FIG. 4A represents a result of the performance test conducted with the lookahead cache staying deactivated. The solid line graph in FIG. 4A represents a result of the performance test conducted with the lookahead cache staying activated.

Referring to FIG. 4A, for example, in the case of workloads W1 and W2, the storage device 100 may exhibit better performance when the lookahead cache stays activated then when the lookahead cache stays deactivated. The workloads W1 and W2 may represent the case where the total data size being processed by the storage device 100 is relatively small. In the case of workloads W1 and W2, there may be no bottleneck caused by the lookahead cache.

However, in the case of workloads W3 and W4, the storage device 100 may exhibit better performance when the lookahead cache stays deactivated than when the lookahead cache stays activated. The workloads W3 and W4 represent the case where the total data size being processed by the storage device 100 is relatively large. In the case of workloads W3 and W4, there may be a bottleneck caused by the lookahead cache.

The dotted line graph in FIG. 4B represents a result of the performance test conducted with the lookahead cache staying deactivated. The solid line graph in FIG. 4B represents a result of the performance test conducted with the lookahead cache, which is selectively activated or deactivated by the cache manager 123 according to an embodiment of the present invention. Therefore, in FIG. 4B, overlap between the solid line and the dotted line may indicate the result caused by the situation that the lookahead cache is deactivated by the cache manager 123. On the other hand, non-overlap between the solid line and the dotted line may indicate the result caused by the situation that the lookahead cache is activated by the cache manager 123.

Referring to FIG. 4B, according to an embodiment of the present invention, the cache manager 123 may deactivate the lookahead cache for the workloads W3 and W4. That is, when the total data size being processed by storage device 100 is relatively large, such as the case of the workloads W3 and W4, there may be a higher likelihood that the cache manager 123 determines that a bottleneck is caused by the lookahead cache, which may lead to the deactivation of the lookahead cache. On the other hand, the cache manager 123 may activate the lookahead cache for the workloads W1 and W2. When the total data size being processed by storage device 100 is relatively small, such as the case of the workloads W1 and W2, there may be a higher likelihood that the cache manager 123 determines that no bottleneck is caused by the lookahead cache, which may lead to the activation of the lookahead cache. In summary, according to an embodiment of the present invention, the lookahead cache may be selectively deactivated or activated according to the workload and therefore the storage device 100 may provide improved performance for any workload.

While certain embodiments have been described above, it will be understood to those skilled in the art that the embodiments described are by way of example only. Accordingly, the controller of storage device should not be limited based on the described embodiments. Rather, the controller of storage device described herein should only be limited in light of the claims that follow when taken in conjunction with the above description and accompanying drawings. Furthermore, the embodiments may be combined to form additional embodiments.

What is claimed is:

1. A controller of a storage device, the controller comprising:
 a memory configured to serve as a lookahead cache;
 a read request storage configured to store therein read requests; and
 a cache manager configured to
  selectively perform a bottleneck check operation when a process for a read request stored in the read request storage is completed, and
  selectively deactivate the lookahead cache based on a check result in at least one bottleneck check operation,
 wherein the bottleneck check operation is performed when the read request results in a cache hit, and is not performed when the read request results in a cache miss.

2. The controller of claim 1, wherein the cache manager is configured to determine that a bottleneck is caused by the lookahead cache when a pending read request is stored in the read request storage in the bottleneck check operation.

3. The controller of claim 2, wherein the cache manager is configured to keep the lookahead cache activated when no bottleneck is determined in a current bottleneck check operation.

4. The controller of claim 2, wherein the cache manager is configured to deactivate the lookahead cache when a bottleneck is determined in a current bottleneck check operation and a bottleneck is indicated by each of a reference number of consecutive previous bottleneck check operations.

5. The controller of claim 2, wherein the cache manager is configured, in a current bottleneck check operation, to keep the lookahead cache activated when no bottleneck is indicated by at least one of a reference number of consecutive previous bottleneck check operations.

6. The controller of claim 1, wherein the cache manager is configured, in a current bottleneck check operation, to keep the lookahead cache activated when determining that a reference number of consecutive previous bottleneck check operations have not been performed yet after activation of the lookahead cache.

7. The controller of claim 1, wherein the cache manager is configured to add, to a bottleneck history, a result of determining a bottleneck or no bottleneck caused by the lookahead cache whenever performing the bottleneck check operation.

8. The controller of claim 1, wherein the cache manager is configured to perform the bottleneck check operation when the lookahead cache stays activated.

9. A controller of a storage device, the controller comprising:
 a memory configured to serve as a lookahead cache; and
 a cache manager configured to selectively deactivate the lookahead cache by determining, based on a bottleneck history, whether a bottleneck is indicated by each of a reference number of consecutive previous bottleneck check operations.

10. The controller of claim 9, further comprising a read request storage configured to store therein read requests,
 wherein the cache manager is configured to determine, in a bottleneck check operation, that a bottleneck is caused by the lookahead cache when a pending read request is stored in the read request storage at a time of performing the bottleneck check operation.

11. The controller of claim 10, wherein the cache manager is configured to keep the lookahead cache activated when no bottleneck is determined in a current bottleneck check operation.

12. The controller of claim 9, wherein the cache manager is configured to deactivate the lookahead cache when a bottleneck is determined in a current bottleneck check operation and a bottleneck is indicated by each of the reference number of consecutive previous bottleneck check operations.

13. The controller of claim 9, wherein the cache manager is configured, in a current bottleneck check operation, to keep the lookahead cache activated when no bottleneck is indicated by at least one of the reference number of consecutive previous bottleneck check operations.

14. The controller of claim 9, wherein the cache manager is configured, in a current bottleneck check operation, to keep the lookahead cache activated when determining that the reference number of consecutive previous bottleneck check operations have not been performed yet after activation of the lookahead cache.

15. A controller of a storage device, the controller comprising:

a memory configured to serve as a lookahead cache;
a read request storage configured to store therein read requests; and
a cache manager configured to
  determine whether a bottleneck is caused by the lookahead cache based on the read requests stored in the read request storage, and
  deactivate the lookahead cache when it is determined that the bottleneck is caused by the lookahead cache and occurred in a predetermined continuous section based on a bottleneck history.

16. The controller of claim 15, wherein the cache manager is configured to determine the bottleneck is caused by the lookahead cache when a pending read request is stored in the read request storage.

17. The controller of claim 16, wherein the cache manager is configured to keep the lookahead cache activated when the pending read request is not stored in the read request storage.

18. The controller of claim 15, wherein the cache manager is configured to keep the lookahead cache activated when no bottleneck is determined for at least a partial section within a predetermined continuous section based on the bottleneck history.

* * * * *